US011973324B2

(12) United States Patent
Wang et al.

(10) Patent No.: US 11,973,324 B2
(45) Date of Patent: Apr. 30, 2024

(54) FLAMEPROOF SURGE PROTECTOR

(71) Applicant: EATON INTELLIGENT POWER LIMITED, Dublin (IE)

(72) Inventors: Chunhuai Wang, Shanghai (CN); Haijun Man, Shanghai (CN); Yuru Li, Shanghai (CN); Rotton Lu, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/794,605

(22) PCT Filed: Jan. 22, 2021

(86) PCT No.: PCT/IB2021/000034
§ 371 (c)(1),
(2) Date: Jul. 21, 2022

(87) PCT Pub. No.: WO2021/148885
PCT Pub. Date: Jul. 29, 2021

(65) Prior Publication Data

US 2023/0073865 A1 Mar. 9, 2023

(30) Foreign Application Priority Data

Jan. 22, 2020 (CN) ........................ 202020143385.8

(51) Int. Cl.
*H01T 4/04* (2006.01)
*H01T 4/02* (2006.01)
*H01T 4/08* (2006.01)

(52) U.S. Cl.
CPC ................ *H01T 4/08* (2013.01); *H01T 4/02* (2013.01); *H01T 4/04* (2013.01)

(58) Field of Classification Search
CPC .... H01T 4/08; H01T 4/02; H01T 4/04; H01T 1/15; H01C 7/12
See application file for complete search history.

(56) References Cited

U.S. PATENT DOCUMENTS 4,345,290 A 8/1982 Johnson
4,425,609 A 1/1984 Grindle
(Continued)

FOREIGN PATENT DOCUMENTS

CN 203010328 U 6/2013
CN 105546495 A 5/2016
(Continued)

OTHER PUBLICATIONS

International Search Report and Written Opinion for International Application No. PCT/IB2021/000020 mailed Apr. 23, 2021, 13 pages.
(Continued)

*Primary Examiner* — Bryan R Perez
(74) *Attorney, Agent, or Firm* — Baker Botts L.L.P.

(57) ABSTRACT

Provided in the present utility model is a flameproof surge protector, including: a surge protector main body, a flameproof enclosure, a flameproof stopper plug, and a flameproof cable gland. One end of the flameproof enclosure is connected to the flameproof stopper plug, and the other end thereof is connected to the flameproof cable gland. The surge protector main body has an elongated shape and is disposed inside the flameproof enclosure, and a cable is drawn out of the surge protector main body by means of the flameproof cable gland. The flameproof surge protector provided by the present utility model has a simple structure and small size, can be used easily and installed inside an explosion-proof
(Continued)

lamp, further protects a circuit inside the lamp, prevents the circuit from being damaged by surges, and is safe and reliable.

8 Claims, 5 Drawing Sheets

(56) References Cited

U.S. PATENT DOCUMENTS

| | | | | |
|---|---|---|---|---|
| 4,649,457 | A | 3/1987 | Talbot | |
| 5,798,910 | A | 8/1998 | Holbeche | |
| 6,594,133 | B1 * | 7/2003 | Schmidt | H01C 7/12<br>361/127 |
| 2009/0135607 | A1 | 5/2009 | Holloway | |
| 2015/0362156 | A1 | 12/2015 | Chien | |
| 2016/0055945 | A1 | 2/2016 | Tseng | |
| 2020/0012050 | A1 * | 1/2020 | Takano | G02B 6/3888 |

FOREIGN PATENT DOCUMENTS

| | | | | |
|---|---|---|---|---|
| CN | 206300093 | U | 7/2017 | |
| EP | 0810613 | A2 * | 12/1997 | H01C 7/12 |
| GB | 2167616 | A | 5/1986 | |
| KR | 101201153 | B1 | 11/2012 | |
| KR | 20140136664 | A | 12/2014 | |
| KR | 20180047491 | A | 5/2018 | |

OTHER PUBLICATIONS

International Search Report and Written Opinion for International Application No. PCT/IB2021/000034 mailed May 21, 2021, 12 pages.

* cited by examiner

FLAMEPROOF SURGE PROTECTOR

PRIORITY

11 This application claims the benefit under 35 U.S.C. § 371 of International Patent Application No. PCT/IB2021/000034, filed 22 Jan. 2021, which claims the benefit under 35 U.S.C. § 119(a) of Chinese Patent Application No. 202020143385.8, filed 22 Jan. 2020, which are incorporated herein by reference.

TECHNICAL FIELD

The present utility model relates to the field of protection circuit devices and more particularly relates to a flameproof surge protector.

BACKGROUND

Explosion-proof electrical apparatuses mainly refer to electrical apparatuses used at hazardous, potentially flammable, or potentially explosive locations. Commonly used explosion-proof electrical apparatuses are mainly classified into explosion-proof motors, explosion-proof transformers, explosion-proof switch-based apparatuses, explosion-proof lamps, and the like.

Explosion-proof lamps are prone to damage or even failure due to the interference of surge current and surge voltage. A surge refers to a current or voltage spike momentarily generated in an electrical loop or a communication line due to external interference. In order to prevent a surge from damaging an explosion-proof lamp, a surge protector must be installed in a circuit.

A surge protector is an electronic device that provides safety protection for electronic devices, instruments, and communication lines. When a surge occurs in a circuit, a surge protector can perform shunting in a very short time to prevent the surge from damaging other devices in the circuit loop.

However, current surge protectors are generally large, have complex structures, cannot be easily installed and used in a narrow space inside an explosion-proof lamp, and can only be installed in an external circuit.

For example, Chinese invention CN201510721498.5 discloses an integrated explosion-proof current surge protector protected by a flameproof enclosure. FIG. 1 illustrates a schematic diagram of the surge protector provided by said invention. The explosion-proof surge protector shown in FIG. 1 includes a flameproof enclosure 101, a surge protector 102, a fuse 103, a connection member 104, a multi-point ground terminal 105, an explosion-proof cable clamp 106, wherein the fuse 103, the connection member 104, the multi-point ground terminal 105 are disposed in the flameproof enclosure 101, the explosion-proof cable clamp 106 is disposed at the flameproof enclosure 101, and the multi-point ground terminal 105 is connected to ground by means of a wire. The explosion-proof surge protector provided by said invention has a complex structure, is overall excessively large, and cannot be easily installed in the interior space of an explosion-proof lamp.

SUMMARY

The object of the present utility model is to provide a flameproof surge protector that solves the issue in which the surge protector in the prior art is excessively large and cannot be easily employed in an explosion-proof lamp.

In order to achieve the above object, the present utility model provides a flameproof surge protector, comprising a surge protector main body, a flameproof enclosure, a flameproof stopper plug, and a flameproof cable gland, wherein one end of the flameproof enclosure is connected to the flameproof stopper plug, and the other end thereof is connected to the flameproof cable gland; and the surge protector main body has an elongated shape and is disposed inside the flameproof enclosure, and a cable is drawn out of the surge protector main body by means of the flameproof cable gland.

In one embodiment, the two ends of the flameproof enclosure are configured as threaded joints, the flameproof enclosure is threadedly connected to the flameproof stopper plug, and the flameproof enclosure is threadedly connected to the flameproof cable gland.

In one embodiment, the flameproof enclosure has a flameproof chamber having a cylindrical shape.

In one embodiment, the flameproof cable gland has an outer housing made of a metallic material, is internally provided with a seal ring holding the cable for fastening and sealing the cable.

In one embodiment, the minimum number of engaged threads at the threaded joint is 5.

In one embodiment, the minimum thread pitch at the threaded joint is 0.7 mm.

In one embodiment, the insertion volume is greater than 100 $cm^3$ and the minimum axial length of thread engagement is 8 mm.

In one embodiment, the insertion volume is less than 100 $cm^3$ and the minimum axial length of thread engagement is 5 mm.

In one embodiment, the flameproof enclosure is made of a metallic material and is made by an extrusion process or a casting process.

In one embodiment, the surge protector main body has a maximum open-circuit voltage of 10000 V, a maximum short-circuit current of 5000 A, and a response time of less than 25 ns.

The flameproof surge protector provided by the present utility model has a simple structure and small size, can be used easily and installed inside an explosion-proof lamp, further protects a circuit inside the lamp, prevents the circuit from being damaged by surges, and is safe and reliable.

BRIEF DESCRIPTION OF THE DRAWINGS

The above and other features, properties, and advantages of the present utility model will become more apparent from the following description when taken in conjunction with the accompanying drawings and embodiments. The same reference numerals are used throughout the drawings to represent the same features, wherein.

Figure 1:
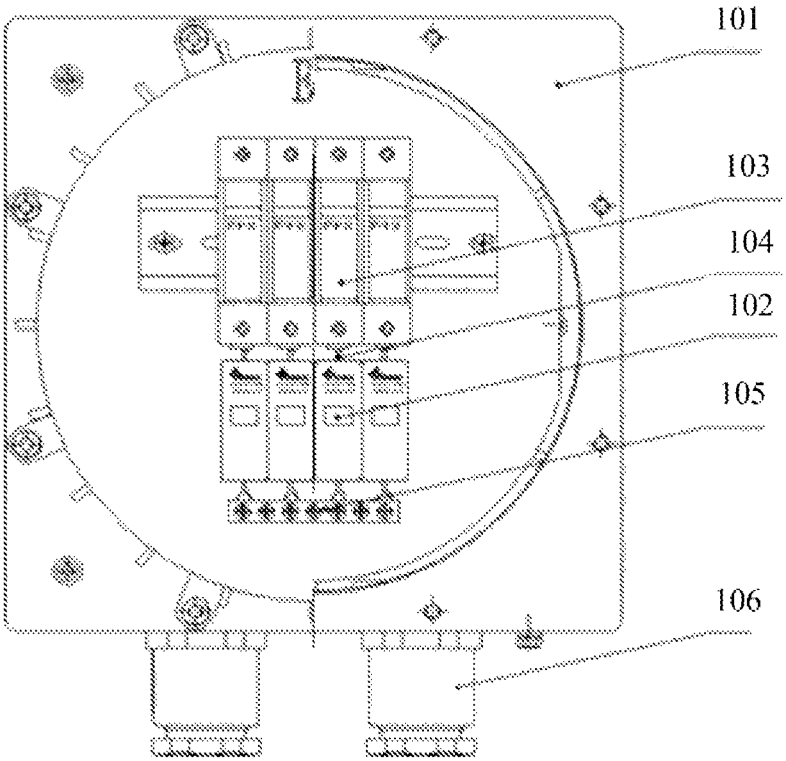
FIG. 1 illustrates a schematic diagram of a prior art surge protector.

The reference numerals in the figures refer to the following:

101 flameproof enclosure;
102 surge protector;
103 fuse;
104 connection member;
105 multi-point ground terminal;
106 explosion-proof cable clamp;
200 flameproof surge protector;
201 flameproof enclosure;
202 flameproof stopper plug;
203 flameproof cable gland;
204 surge protector main body;
205 cable;
300 explosion-proof lamp.

DETAILED DESCRIPTION OF THE EMBODIMENTS

In order to make the object, technical solutions, and advantages of the present utility model more apparent and comprehensible, the present utility model is further described in detail below with reference to the accompanying drawings and embodiments. It should be appreciated that the specific embodiments described herein are merely illustrative of the utility model and are not intended to limit the utility model.

Provided in the present utility model is a flameproof surge protector that can be used in explosion-proof lamps or lighting devices operating in outdoor or indoor areas in hazardous fields, such as fields related to corrosion, moisture, processing and manufacturing, pharmaceuticals, and petrochemicals.

Flameproof protection is an explosion-proof protection method that employs the technique of allowing internal explosions but preventing flame propagation, and is one of the most commonly used types of explosion-proof method. Flameproof protection refers to the use of a flameproof enclosure to prevent explosions. A flameproof enclosure can withstand the explosion pressure of an explosive gas mixture therein and prevent an internal explosion from propagating to explosive mixtures around the enclosure. The enclosure is a structure designed using a principle of explosion-proof protection by means of a gap, that is, using a metal gap to prevent the propagation of an explosive flame and cool the temperature of an explosive product, so as to achieve flame extinction and temperature reduction and thereby suppress explosion propagation.

Figure 2:
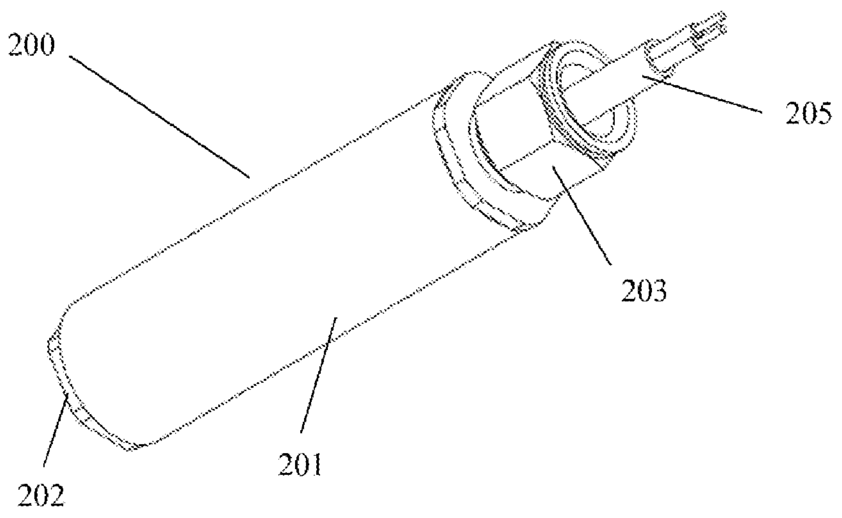
FIG. 2 illustrates a perspective view of a flameproof surge protector according to an embodiment of the present utility model.
Figure 3A:
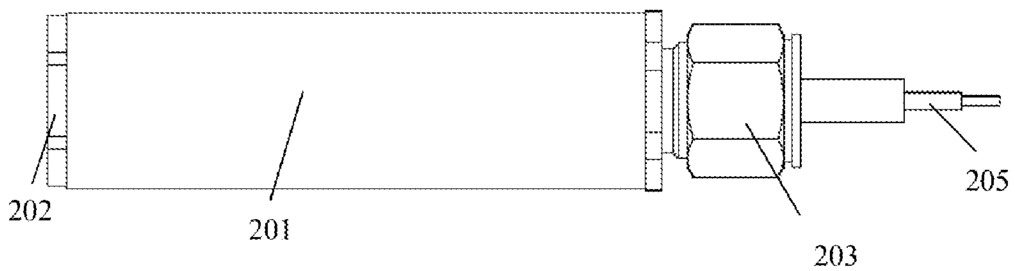
FIG. 3*a* illustrates a front view of the flameproof surge protector according to an embodiment of the present utility model.
Figure 3B:
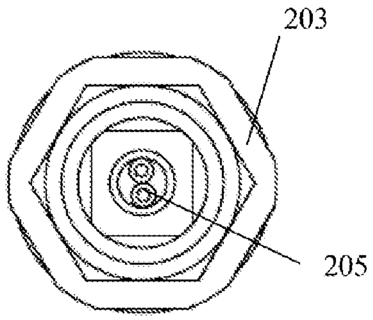
FIG. 3*b* illustrates a right view of the flameproof surge protector according to an embodiment of the utility model.
Figure 3C:
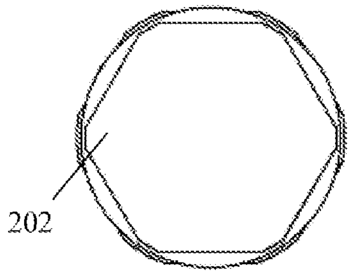
FIG. 3*c* illustrates a left view of the flameproof surge protector according to an embodiment of the present utility model.
Figure 4:
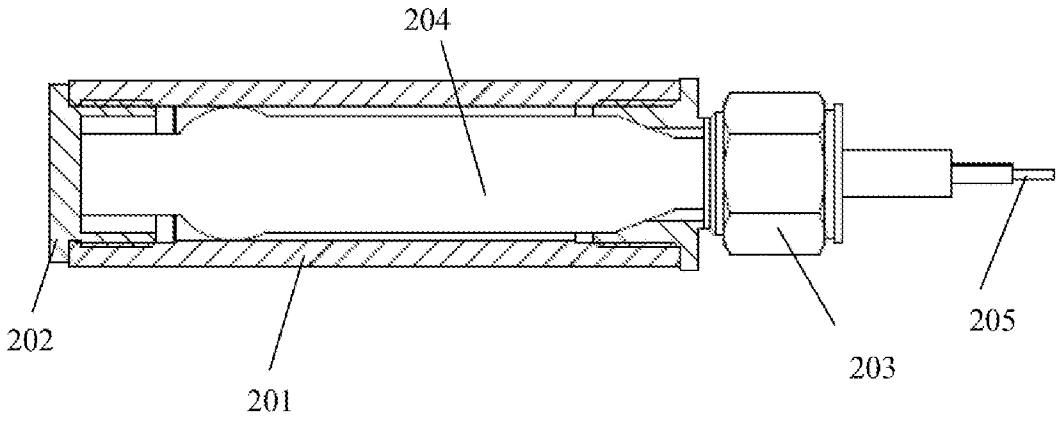
FIG. 4 illustrates a cross-sectional schematic diagram of the flameproof surge protector according to an embodiment of the present utility model.

FIG. 2 illustrates a perspective view of a flameproof surge protector according to an embodiment of the present utility model. FIG. 3*a* illustrates a front view of the flameproof surge protector according to an embodiment of the present utility model. FIG. 3*b* illustrates a right view of the flameproof surge protector according to an embodiment of the utility model. FIG. 3*c* illustrates a left view of the flameproof surge protector according to an embodiment of the present utility model. FIG. 4 illustrates a cross-sectional schematic diagram of the flameproof surge protector according to an embodiment of the present utility model.

In the embodiments shown in FIGS. 2-4, a flameproof surge protector 200 provided by the present utility model includes a surge protector main body 204, a flameproof enclosure 201, a flameproof stopper plug 202, and a flameproof cable gland 203.

One end of the flameproof enclosure 201 is connected to the flameproof stopper plug 202, and the other end thereof is connected to the flameproof cable gland 203.

The surge protector body 204 has an elongated shape and is disposed inside the flameproof enclosure 201, and a cable 205 is drawn out of the surge protector main body 204 by means of the flameproof cable gland 203.

The flameproof enclosure 201 is threadedly connected to the flameproof stopper plug 202.

The flameproof enclosure 201 is threadedly connected to the flameproof cable gland 203.

The two ends of the flameproof enclosure 201 are configured as threaded joints that should conform to a corresponding explosion-proof standard.

Still further, the thread length and the number of engaged threads at the threaded joint should conform to a corresponding explosion-proof standard.

Optionally, the explosion-proof standard is the national standard "GB 3836.2 Explosive atmospheres—Part 2".

Optionally, the explosion-proof standard is the International Electrotechnical Commission Standard IEC 60079-1.

Still further, the minimum number of engaged threads at the threaded joint is 5.

Still further, if the insertion volume is greater than 100 $cm^3$, the minimum axial length of thread engagement at the threaded joint is 8 mm.

Still further, if the insertion volume is not greater than 100 $cm^3$, the minimum axial length of thread engagement at the threaded joint is 5 mm.

Still further, the minimum thread pitch at the threaded joint is 0.7 mm.

In the embodiments shown in FIGS. 2-4, the flameproof enclosure 201 is made of a metallic material that is preferably aluminum.

In the embodiments shown in FIGS. 2-4, a corresponding manufacturing process for the flameproof enclosure 201 is an extrusion process or a casting process.

In embodiments shown in FIGS. 2-4, the flameproof enclosure 201 has an interior cavity, that is, a flameproof chamber, having a cylindrical shape.

Obviously, the flameproof chamber can also be made in other shapes such as square, but cylindrical flameproof chambers tend to have sufficient strength to pass a flameproof pressure test and are therefore preferred embodiments.

In the embodiments shown in FIGS. 2-4, one end of the flameproof enclosure 201 is connected to the flameproof stopper plug 202, and the flameproof stopper plug 202 blocks the one end of the flameproof enclosure 201, isolating the flameproof enclosure 201 from being affected by internal and external pressure, temperature, and the like.

The flameproof stopper plug 202 is threadedly connected to the flameproof enclosure 201.

In the embodiments shown in FIGS. 2-4, the flameproof stopper plug 202 is made of a metallic material.

In the embodiments shown in FIGS. 2-4, the flameproof stopper plug 202 having a model number M25 meets a corresponding explosion-proof standard, serves as an assembly part that is certified as explosion-proof, and is equivalent to a standard part used in the explosion-proof industry.

In the embodiments shown in FIGS. 2-4, the other end of the flameproof enclosure 201 is the flameproof cable gland 203, and the flameproof cable gland 203 blocks the other end of the flameproof enclosure 201 and draws out the cable 205. The cable 205 is an input/output cable of the surge protector main body 204.

The flameproof cable gland 203 is threadedly connected to the flameproof enclosure 201.

Cable glands are also known as waterproof cable connectors or cable-fixing heads, and are widely used for fixing and protecting electrical wires or cables of mechanical apparatuses or electronics, marine electronics, and corrosion prevention apparatuses. Cable glands are used in all portions from which cables are drawn out.

In the embodiments shown in FIGS. 2-4, the flameproof cable gland 203 having a model number M25 meets a corresponding explosion-proof standard, serves as an assembly part that is certified as explosion-proof, and is equivalent to a standard part used in the explosion-proof industry.

The flameproof cable gland 203 has an outer housing made of a metallic material, is internally provided with a seal ring holding the cable 205 for fastening and sealing the cable 205.

Fastening the cable 205 by means of the flameproof cable gland 203 refers to locking the cable 205 by means of the flameproof cable gland 203 so as to prevent the cable 205 from moving axially or rotating radially, which ensures that the cable 205 can be properly connected.

Sealing the cable 205 by means of the flameproof cable gland 203 refers to protecting the cable 205 against dust and water.

In the embodiments shown in FIGS. 2-4, the flameproof chamber inside the flameproof enclosure 201 is provided with the surge protector main body 204.

The surge protector main body 204 may be a general surge protector.

Considering the limited interior space of an explosion-proof lamp, in order to reduce the size of the flameproof surge protector 200, the surge protector main body 204 must have an elongated shape.

In addition, there are no special requirements for other parameters of the surge protector main body.

In the embodiments shown in FIGS. 2-4, the surge protection capability of the flameproof surge protector 200 includes the following parameters:

a maximum open-circuit voltage Uoc of 10000 V;

a maximum short-circuit current Isc of 5000 A;

a response time of less than 25 ns;

a maximum continuous voltage of 320 V;

a rated voltage of 100-300 V;

a maximum discharge current Imax (8/20 us) of 10000 A; and a nominal discharge current In of 5000 A.

In the present utility model, both explosion-proof and space requirements can be achieved by employing a general surge protector having an elongated shape, because of the following:

1) The surge protector main body 204 having an elongated shape allows a flameproof chamber of the flameproof enclosure 201 to be made cylindrical, wherein the cylindrical flameproof chamber tends to have sufficient strength;

2) The flameproof enclosure 201 can be made cylindrical, and the two ends thereof can be configured as threaded joints, such that the flameproof enclosure can achieve explosion-proof functions more easily than a square-shaped flameproof enclosure;

3) The flameproof enclosure 201 can be made cylindrical, and the two ends thereof are respectively connected to a smaller flameproof stopper plug 202 and a smaller flameproof cable gland 203, such that the flameproof enclosure can have a smaller size than a square-shaped flameproof enclosure.

Additionally, the elongated shape of the surge protector main body 204 allows the flameproof enclosure 201 to be made by an extrusion process rather than using a mold for casting.

The flameproof surge protector 200 provided by the present utility model includes the flameproof enclosure 201, which can be made of aluminum and formed by extrusion molding. One end of the flameproof enclosure 201 is inserted into the flameproof stopper plug 202 having a model number M25, and the other end thereof draws out the cable 205 using the flameproof cable gland 203 having a model number M25.

Figure 5:
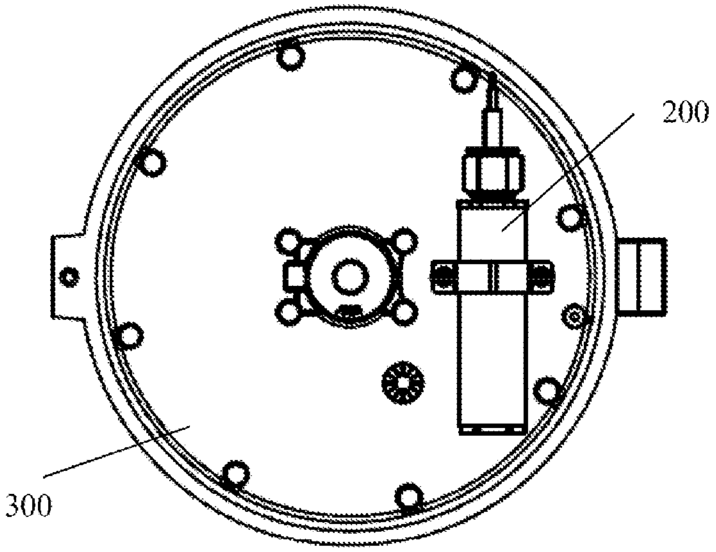
FIG. 5 illustrates a schematic diagram of an installation arrangement of the flameproof surge protector according to an embodiment of the present utility model.

FIG. 5 illustrates a schematic diagram of an installation arrangement of the flameproof surge protector according to an embodiment of the present utility model. As shown in FIG. 5, the flameproof surge protector 200 is small and thus suitable for being fixed inside an explosion-proof lamp 300.

The flameproof surge protector provided by the present utility model has a simple structure and small size, can be used easily and installed inside an explosion-proof lamp, further protects a circuit inside the lamp, prevents the circuit from being damaged by surges, and is safe and reliable.

Although the above methods are illustrated and described as a series of actions for simplicity of explanation, it should be understood and appreciated that these methods are not limited by the order of the actions because, according to one or more embodiments, some actions may occur in different orders and/or occur concurrently with other actions illustrated and described herein or not illustrated and described herein but understood by those skilled in the art.

As set forth in the present application and the claims, the terms “a”, “an”, “one”, and/or “the” are not specifically singular and can be plural, unless the context clearly indicates otherwise. In general, the terms “include” and “comprise” indicate only the inclusion of explicitly identified steps or elements, which do not constitute an exclusive list, and methods or apparatuses may also comprise other steps or elements.

The above embodiments are provided to those skilled in the art to implement or use the present utility model. Those skilled in the art can make various modifications or changes without departing from the concept of the utility model, and thus the scope of protection of the present utility model is not limited by the above embodiments, but should be consistent to the maximum extent with the innovative features mentioned in the claims.

The invention claimed is:

1. A flameproof surge protector, characterized by comprising a surge protector main body, a flameproof enclosure, a flameproof stopper plug, and a flameproof cable gland, wherein one end of the flameproof enclosure is connected to the flameproof stopper plug, and another end of the flameproof enclosure is connected to the flameproof cable gland, wherein the flameproof enclosure, the flameproof stopper plug, and the flameproof cable gland define a flameproof chamber that isolates the surge protector main body from external hazardous conditions; and the surge protector main body has an elongated shape and is disposed inside the flameproof enclosure, and a cable is drawn out of the surge protector main body by means of the flameproof cable gland.

2. The flameproof surge protector according to claim 1, wherein:

the two ends of the flameproof enclosure are configured as threaded joints, the flameproof enclosure is threadedly connected to the flameproof stopper plug, and the flameproof enclosure is threadedly connected to the flameproof cable gland.

3. The flameproof surge protector according to claim 2, wherein each of the threaded joints has at least 5 engaged threads.

4. The flameproof surge protector according to claim 2, wherein each of the threaded joints each has a thread pitch of at least 0.7 mm.

5. The flameproof surge protector according to claim 1, wherein the flameproof chamber has a cylindrical shape.

6. The flameproof surge protector according to claim 1, wherein the flameproof cable gland has an outer housing made of a metallic material and is internally provided with a seal ring holding the cable for fastening and sealing the cable.

7. The flameproof surge protector according to claim 1, wherein the flameproof enclosure is made of a metallic material and is made by an extrusion process or a casting process.

8. The flameproof surge protector according to claim 1, wherein the surge protector main body has a maximum open-circuit voltage of 10000 V, a maximum short-circuit current of 5000 A, and a response time of less than 25 ns.

* * * * *